United States Patent [19]

Cooper-Hart et al.

[11] Patent Number: 4,715,059
[45] Date of Patent: Dec. 22, 1987

[54] CONVERSATIONAL VIDEO PHONE

[75] Inventors: Michael A. Cooper-Hart, Cupertino; Lawrence D. Emmons; James S. Mackley, both of Grass Valley; David H. Stokes, Nevada City, all of Calif.

[73] Assignee: Luma Telecom, Inc., Santa Clara, Calif.

[21] Appl. No.: 795,967

[22] Filed: Nov. 7, 1985

[51] Int. Cl.⁴ .................... H04M 11/00; H04N 7/14
[52] U.S. Cl. .................................. 379/53; 379/98; 358/85
[58] Field of Search .......... 179/2 DP, 2 TV; 358/85, 358/183; 379/53, 93, 98

[56] References Cited

U.S. PATENT DOCUMENTS

| | | | |
|---|---|---|---|
| 3,495,908 | 2/1970 | Rea | 358/85 X |
| 3,842,199 | 10/1974 | Gibson | 179/2 TV X |
| 3,970,792 | 7/1976 | Benham et al. | 179/2 TV |
| 4,099,202 | 7/1978 | Cavanaugh | 358/85 |
| 4,222,076 | 9/1980 | Knowlton | 358/263 |
| 4,232,196 | 11/1980 | Filippi | 179/2 TV |
| 4,399,462 | 8/1983 | Balopole et al. | 358/183 |
| 4,467,355 | 8/1984 | Matsuda | 358/183 X |
| 4,485,400 | 11/1984 | Lemelson et al. | 358/85 |
| 4,516,151 | 5/1985 | Stahler | 358/85 X |

FOREIGN PATENT DOCUMENTS

| | | | |
|---|---|---|---|
| 3329493 | 9/1984 | Fed. Rep. of Germany | 379/53 |
| 0158182 | 9/1984 | Japan | 179/2 TV |

OTHER PUBLICATIONS

Klein, "Desktop Teleconferencing", Siemens Telcom Report, Jan./Feb. 1987, pp. 2-6.
Tele Conference, "First Visual Telephone for Everyday Use", p. 26, vol. 5, No. 4, Jun./Jul. 1986.
The Sharper Image, "Introducing Luma", pp. 1-3, Jul. 1986.
RCA, "The Walkie-Talkie-Lookie", Electronic Design, Oct. 11, 1974.
Southworth, "Slow-Scon Television", Telecommunications, pp. 107-108, 115,134, Jul. 1986.

Primary Examiner—Gene Z. Rubinson
Assistant Examiner—Matthew E. Conners
Attorney, Agent, or Firm—Townsend & Townsend

[57] ABSTRACT

The present invention is a conversational freeze-frame video phone which transmits a source image over a standard telephone line in conjunction with audio voice signals. A camera is used to capture an image to be transmitted and the image is mapped onto an image field of 2,000 to 5,000 pixels. The image field is displayed on a display area of approximately one square inch on a display screen. Digitized data representing the pixels is asynchronously transmitted on a modulated signal in a single burst of less than three seconds duration. Corresponding remote images are asynchronously received, demodulated, and displayed. The transmission of the audio signal is interrupted upon the detection of a video image being transmitted.

23 Claims, 2 Drawing Figures

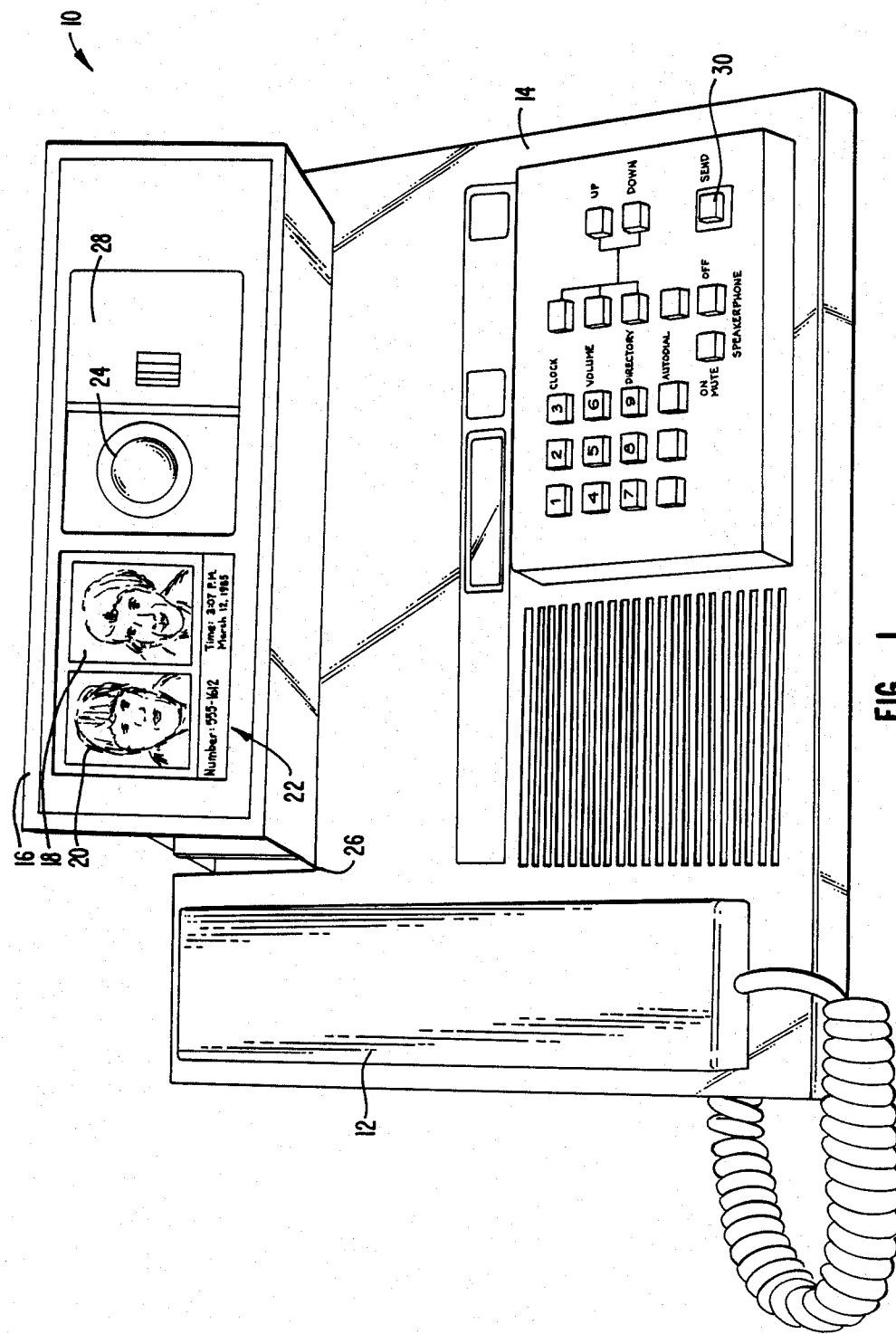
FIG._1.

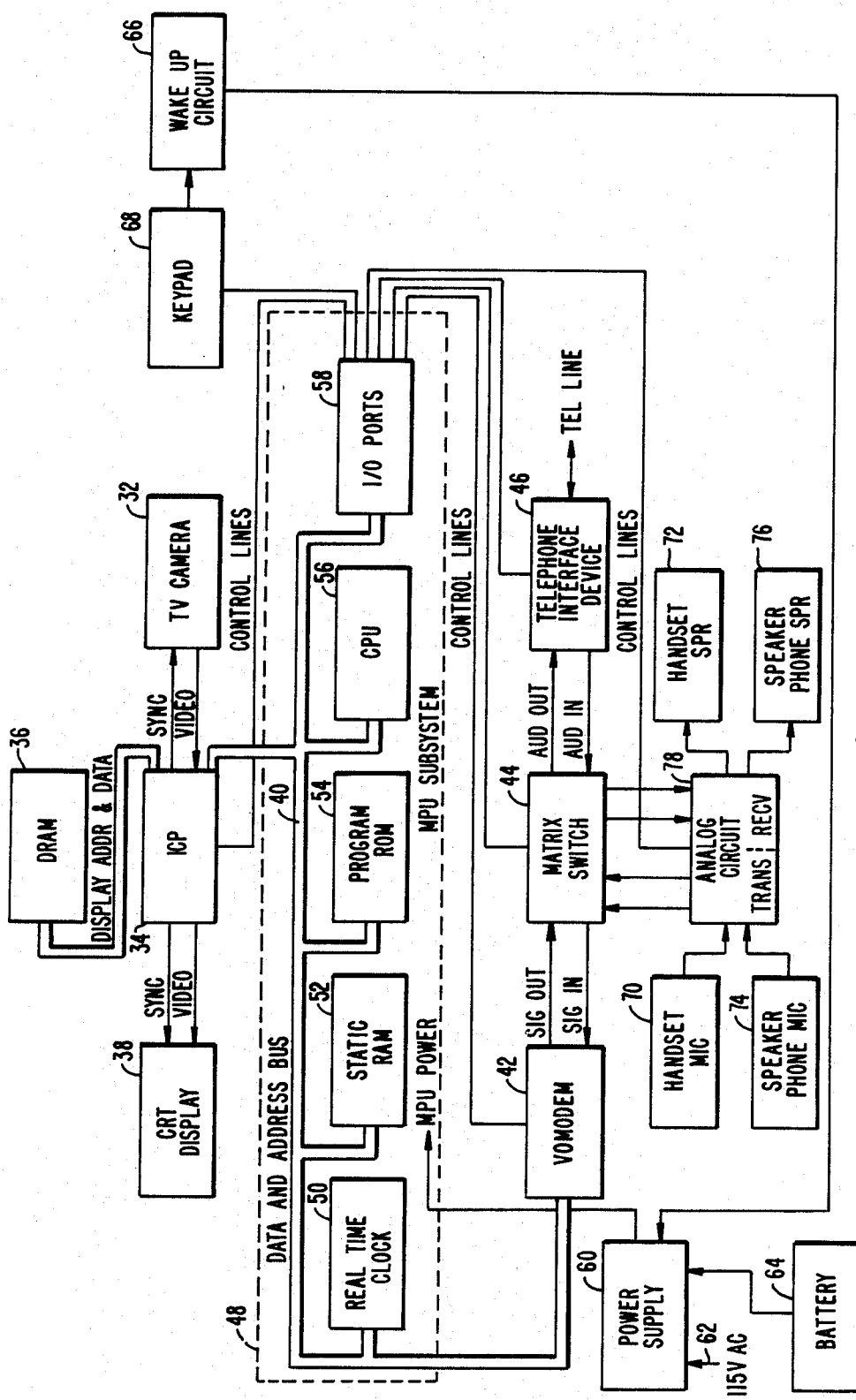
FIG._2.

CONVERSATIONAL VIDEO PHONE

BACKGROUND OF THE INVENTION

This invention relates to a video phone for transmission of audio signals and freeze-frame video images over voice grade telephone lines.

Video teleconferencing systems typically require dedicated communication channels with a high bandwidth in order to transmit the large amount of data required to represent a complex video picture as in the case of text or graphics. Such devices require a communication channel having a bandwidth in the megahertz (MHz) range. See, for example, U.S. Pat. No. 3,982,063.

Video transmission systems intended to operate over voice grade telephone lines must contend with the fact that the usable telephone bandwidth is only approximately three kilohertz. Because of this bandwidth limitation and a corresponding limitation in the amount of data that can be sent, some of these systems only send a single video frame, rather than a moving picture. In addition, a long time is required for transmission, usually in the range of thirty to sixty seconds or more. See, for example, U.S. Pat. No. 3,842,199, which discloses a video (only) transmission system and U.S. Pat. No. 4,099,202 which discloses a method for multiplexing a slow scan TV signal with a voice signal.

Systems which transmit a single video frame over telephone lines have been touted for their ability to transmit text and graphics such as charts and the like. Accordingly, the resolution of the picture must be sufficiently high to allow a viewer to discern this material. This high resolution requirement results in a long transmission time. Some systems are claimed to be operable with transmission times as low as 8 seconds but with admittedly deteriorated picture quality. Other systems claim transmission times as low as 5 seconds by sending only black and white pixels with no gray scale. However, while a low resolution black and white picture is suitable for very simple graphics, it is not suitable to accurately represent images which have a large grey scale component, such as people's faces.

The long transmission times for video pictures over telephone lines make a telephone unusable for voice communication during image transmission unless a multiplexing system is used. In the simpler, non-multiplexed systems, the user must alternate between using the telephone line for voice communication and using the telephone line for sending video images.

The high transmission speeds are accomplished by a combination of accepting deteriorated picture quality or no gray scale and the use of data compression. Data compression techniques are expensive and complicated to implement. A frequently used method of data compression is run length encoding. For example, if 10 pixels in a row are black, instead of transmitting 10 signals indicating black, one signal indicating black and one signal indicating 10 repetitions are transmitted. Other data compression techniques are more complex.

SUMMARY OF THE INVENTION

The present invention is a conversational freeze-frame video phone which transmits a source image over a standard telephone line in conjunction with audio voice signals. A camera is used to capture an image to be transmitted and the image is mapped onto an image field of up to 5,000 pixels. This image field is displayed on a video screen having an area of approximately one square inch. Digitized data representing the pixels is asynchronously transmitted on a modulated signal in a single burst of less than three seconds duration. Corresponding remote images are asynchronously received, demodulated, and displayed.

The video phone of the present invention is conversational because video frames are transmitted during normal pauses in conversation. This is accomplished without the use of multiplexing or data compression, which are complicated and expensive to implement. The present invention uniquely combines the results of physiological and technological research to produce a new device, i.e., a conversational video phone. The invention provides a picture size and resolution which can be both: (1) integrated by a viewer's eye at arm's length to be recognized as the image of a particular individual's face and (2) transmitted using available modulation techniques and transmission rates over a voice grade telephone line in a period of time which is not a noticeable interruption to normal conversation. The small picture size is made more acceptable to a viewer by presenting it alongside a mirror image of the viewer thereby enhancing the viewer's perception of the size of the display being presented.

Typical conversational pauses have been found to be approximately three seconds in length, and therefore an interruption of this duration in audio transmission does not unduly interfere with conversation. The additional features of requiring a user to push a button to initiate a picture transmission and the displaying of the picture as transmitted line by line cause the viewer to pause in his conversation for a slightly longer period than is normal to further insure that the transmission burst for the image will not noticeably interfere with a conversation on the video phone.

It should be emphasized that the present invention is not intended for use as a video teleconferencing tool in the conventional sense, and departs from the prior art objective of providing sufficiently high resolution to send text or graphics. Rather, the present invention recognizes that the transmission of facial images is adequately served by using low resolution, small size picture frames provided the grey scale is adequate. This recognition allows transmission in less than three seconds, a result which makes the video phone conversational. The invention thus departs from prior art attempts to compress data and uniquely integrates physiological and technological factors to produce a new device rather than simply optimizing and compromising various features of a conventional video phone. This represents a departure from prior art devices which essentially allowed a user to switch between a telephone and a video transmitter. The invention appears to the user to be simultaneously transmitting audio and video, while in actuality it asynchronously transmits video in short bursts during conversational pauses which appear natural but are initiated by the operation of the video transmission control by the user.

The asynchronous burst of video information used by the present invention eliminates the need for synchronizing as required for a multiplexed system. A time-multiplexed system requires more synchronizing data than the present invention and thus a longer overall transmission time. The invention utilizes an initialization protocol which signals that a video image transmission is coming. Upon detection of this portion of the protocol, audio transmission is inhibited. The remaining portion of the protocol provides for automatic gain control (AGC) and amplitude calibration prior to reception of the video image data itself.

The video phone preferably has a display screen which displays an image from a remote source, a real time mirror image view of the sender, and alphanumeric data. The combination of these various displays on one screen enhances the viewer's perception of the size and amount of information being seen, thereby counteracting to some extent the relatively small size of the picture by itself. The use of a mirror image real time display allows the sender to easily prepare his or her image for sending. The camera used is adjustable in height and has a depth of a field from one to four feet so that a person within arm's length will be in focus. The user must initiate the transmission of his or her image by pressing a button, thereby insuring privacy as well as occupying the user's attention so as to make the interruption of audio transmissions less noticeable.

The camera is positioned close to the real time source display and to one side of that display. The close positioning avoids the parallax problem wherein the user appears to be looking off to the side due to the fact that he or she is looking at a mirror image at some distance from the camera. The positioning of the camera to one side of the user's mirror image, rather than above the image, avoids the appearance that the recipient is looking up or down.

The image is displayed line by line as it is transmitted or received, thereby enabling the viewer to observe the image as it is forming. This occupies the viewer's attention for a moment and further increases the length of the acceptable gap in conversation upon the sending of an image.

The video data captured by the video camera is digitized and stored in the video phone's digital memory. This digitized data can be used to modulate a carrier signal for transmission and can be used to provide an input signal to a display screen for the real time display. The digitization of the data enables the handling of the data by a microprocessor which controls the video phone. The video phone includes a switch for alternately coupling either a carrier signal modulated by the video data or the ordinary analog voice signals to the telephone line. Similarly, for received signals, the switches operate to direct the received signals, as appropriate, to either a demodulator or a speaker.

A keyboard is also provided with the video phone to enable the user to dial telephone numbers and to input other data to the microprocessor. The use of microprocessor control allows expansion of the functions of the video phone limited only by the imagination of the user. The display screen, which can display alphanumeric data as well as the video images, can provide an electronic telephone directory, a printout of the number dialed and other features.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a perspective view of a preferred embodiment of the video phone of the present invention; and FIG. 2 is a block diagram of the video phone of FIG. 1.

DETAILED DESCRIPTION OF THE PREFERRED EMBODIMENT

FIG. 1 is a perspective view of a preferred embodiment of a conversational video phone 10 according to the present invention. Video phone 10 includes a custom telephone handset 12 as well as a keypad 14. A display screen 16 has a real time source image display 18 and a remote image display 20. Also included is an alphanumeric display area 22. A camera 24 is located adjacent display 16 for capturing a source image.

Camera 24 and display 16 are mounted for rotation about a cylinder mechanism 26. This allows a user to adjust camera 24 to his or her height. A privacy panel 28 can be placed across camera 24 for sender security or to protect camera 24 from ambient light when not in use. Keypad 14 includes typical telephone dialing pushbuttons as well as special control buttons. A send button 30 is used to initiate the transmission of a video image. In addition, a remote send switch may be located on handset 12. This enables a user to transmit a picture when he is more than an arms length from the body of video phone 10.

Images 18 and 20 are composed from 2,000 to 5,000 pixels. Preferably, a picture size of 48×48 (2304) to 64×64 (4096) pixels is used with an area of approximately one square inch. The picture size can be user-selectable between 48×48 and 64×64 pixels. This combination of resolution and screen size has been experimentally determined to provide the result that a viewer sitting at arms length will recognize an image of a person's face by mentally integrating the pixels actually displayed. The display of two images side by side on the same display screen 16, as well as the inclusion of alphanumeric data 22, gives the viewer the perception that he is seeing a much larger picture than is actually the case.

In order to send a picture in which a person appears to be looking at the viewer, the user should look directly into camera 24. However, most users will look at the real time mirror image display 18 and thus, from the point of view of camera 24, it will appear that the person is looking to a side or up or down, depending upon the location of the camera relative to real time image 18. This parallax problem is solved by placing the camera relatively close to image 18. Preferably, camera 24 is within one inch of real time video image 18.

The use of a microprocessor to control video phone 10 expands the capabilities of the video phone and allows for future expansion of such capabilities. For instance, using keypad 14, one can tap into a stored directory and thus have an electronic telephone directory displayed on alphanumeric display 22. Video phone 10 could also be programmed to provide auto dial and other functions.

FIG. 2 is a block diagram of the circuitry of the present invention. A TV camera 32 is used to capture a video image of the telephone user. The image from camera 32 is fed to an image control processing (ICP) circuit 34. ICP circuit 34 can be a standard video display processor with additional circuitry for digitizing the video image. The video display processor portion contains the video sync generator and a system timing circuit for generating all the system clocks. Processing circuit 34 digitizes the video data from camera 32 and stores the resultant data in dynamic RAM 36. Processing circuit 34 can also retrieve the data from RAM 36 and convert the data into analog form by means of a digital to analog (D/A) converter in circuit 34. The analog values are then fed to a cathode ray tube (CRT) display 38 to display the image. Processing circuit 34 also transfers data from RAM 36 to a microprocessor bus 40 from which it can be fed to a video optimized modem 42. A preferred embodiment of modem 42 is disclosed in co-pending application Ser. No. 745,091. Modem 42 operates to modulate a carrier signal with the image data and feed the signal through a matrix switch 44 to a telephone interface circuit 46 for transmission to the telephone line.

The operation of the video phone is controlled by a microprocessor unit 48 which includes a clock 50, a static RAM 52, a ROM 54, a central processing unit (CPU) 56, and input/output ports 58. Microprocessor 48 is powered by a power supply 60 which is fed by the 115 volt A/C line voltage 62 with a battery backup 64. The power supply may be actuated by a wakeup circuit 66 if the video phone is battery powered. Wakeup circuit 66 is controlled by a keypad 68 on the video phone. If line power is used, wakeup circuit 66 can be bypassed or eliminated.

The video phone also includes normal telephone audio circuits for transmission of voices including a handset microphone 70 and a handset speaker 72 as well as a speaker phone microphone 74 and a speaker phone speaker 76. Microphones and speakers 70, 72, 74, and 76 are coupled through an analog circuit 78 to matrix switch 44 for connection through interface 46 to the telephone line.

Matrix switch 44 is under the control of microprocessor unit 48 and provides appropriate paths for signals to and from interface circuit 46, modem 42, and analog circuit 78. Interface circuit 46 includes a duplexer, a programmable line impendance matching network, a delay equalizer, a ring detect circuit, a line protection circuit, a loop current circuit, and a hook switch relay.

Analog circuit 78 receives audio signals from the handset and speaker phone microphones 70, 74 and amplifies these signals which are then applied to the telephone line through matrix switch 44 and interface circuit 46. Analog circuit 78 also amplifies audio information received from a remote user and applies the amplified signals to handset speaker 72 or speaker phone speaker 76.

Microprocessor unit 48 can be used to expand the capabilities of the video phone. A static RAM 52 can be used to store directory information or other data utilized by a program stored in program ROM 54. Battery 64 ensures that information in static RAM 52 is retained when A/C power is not applied. ICP circuit 34 operates to process data from microprocessor unit 48 and display such data as graphics or alphanumerics on CRT 38.

A number of features are programmed into the video phone. It has a built-in directory with a video display of the names and numbers. An auto-dial feature with video feedback of the number being dialed is provided. Microprocessor unit 48 also enables the video phone to utilize either pulse or tone dialing.

The protocol used by the video phone to initiate an interruption of audio transmission for the transmission of a video image asynchronously establishes a communication link in a short period of time. Due to the need for keeping interruptions of audio transmissions short, the long protocols used for TV or facsimile machines are not adequate for this purpose. The protocol is initiated by a hardware preamble which synchronizes a phase lock loop in the demodulator of the receiving video phone. This pattern is detected by the modem hardware in the receiver.

A preferred modulation scheme using two phases and eight amplitude levels is disclosed in co-pending patent application Ser. No. 745,091, filed June 14, 1985, which is hereby incorporated by reference. For this modulation scheme, the hardware preamble consists of a carrier burst at the maximum amplitude of the modulation levels at a first phase which is transmitted sixteen times. This is followed by a data clock synch pattern which is transmitted a total of twenty times. The data clock pattern consists of a symbol at maximum amplitude at the first phase followed by a symbol at maximum amplitude at a second phase. A second carrier burst at maximum amplitude in the first phase is then transmitted eight times. This is followed by a pattern transmitted four times which consists of a carrier burst at maximum amplitude in the first phase for four symbols followed by an eight symbol pattern of phase changes at maximum amplitude.

Upon recognition of the hardware preamble by modem 42, microprocessor 40 directs matrix switch 44 to disconnect the audio input from analog circuit 78 until the video image is received. Following the hardware preamble, which provides for the initial synchronization of the equipment, a software preamble is sent and received and verified by the software in the receiver to indicate that a video frame is to follow. Following the software preamble, a pattern is transmitted to provide for automatic gain control (AGC) adjustment. After the AGC pattern, a calibration line pattern is transmitted, giving a pattern of symbols at each amplitude level to calibrate the receiver to the actual amplitude levels received.

Following the calibration pattern, an ID line can be sent to indicate the configuration of the video phone sending the data and the type of video image being sent.

Following the protocol, the data representing the pixels of a video image are sent according to a modulation scheme which minimizes the effect of errors while maximizing transmission speed. Such a modulation scheme is shown in co-pending application Ser. No. 745,091.

The modulation scheme used provides for a data rate of approximately 7000 bits per second. This rate allows a 48×48 pixel image to be transmitted in less than three seconds. In operation, the sender of an image is distracted by having to push the send button. Thus the sender does not notice the three-second interruption in audio transmission. The receiving video phone displays the received image line by line on display 20. This distracts the receiver of the image so that he does not notice the three second interruption in audio transmission. Thus, an asynchronous video burst transmission is disguised to the user so that it appears to be a simultaneous transmission.

As will be understood by those familiar with the art, the present invention may be embodied in other specific forms without departing from the spirit or essential characteristics thereof. For example, the arrangement of the displays of the remote and source images on the display screen can be varied, or the position of the camera could be moved. Accordingly, the disclosure of the preferred embodiment of the present invention is intended to be illustrative, but not limiting, of the scope of the invention which is set forth in the following claims.

What is claimed is:

1. A conversational freeze-frame video phone for transmitting a single frame of a video gray scale source image over an ordinary telephone line, comprising:
   camera means for capturing said video source image;
   a memory coupled to said camera means for storing said single frame of said video source image;
   means for mapping said video source image onto a video source image field of from 2000 to 5,000 pixels;
   video source image display means for displaying said video source image field on a first display screen area having an area of approximately one square inch as a real time mirror image of said video source image;
   means, coupled to said telephone line, for asynchronously transmitting a modulated signal representing said source image field in a burst having an approximate duration of three seconds or less;
   means, coupled to said telephone line, for asynchronously receiving a modulated signal representing a remote video image field;
   means for demodulating said received signal;
   remote video image display means for displaying said remote image field on a second display screen area immediately adjacent said first display screen and having an area of approximately one square inch and adapted to display said remote video image field line by line as each line is received by said receiving means; and
   means, coupled to said telephone line, for transmitting and receiving an audio signal.

2. The apparatus of claim 1 wherein said asynchronous image transmission means is adapted to send data at a data rate which is sufficiently high to transmit said video source image field without the use of data compression.

3. The apparatus of claim 1 further comprising switch means, connected for activation by a user, for selecting said frame of said video source image and initiating the transmission of said video source image field for said frame.

4. The apparatus of claim 1 wherein said transmitting means is operative to transmit protocol data prior to transmission of said burst, said protocol data comprising:
   hardware preamble data for use by a remote video phone to synchronize a clock at said remote video phone with said protocol data;
   software preamble data for identifying the following data as representing a video image;
   automatic gain control adjustment data; and
   amplitude calibration data for correlating each received amplitude modulation level to a corresponding assigned amplitude modulation level.

5. The apparatus of claim 4 further comprising means, responsive to said software preamble data, for disabling said audio transmitting and receiving means.

6. The apparatus of claim 4 wherein said modulated signal comprises a plurality of phases and amplitude levels and wherein said amplitude calibration data comprises each of said amplitude levels at a first phase and at least one of said amplitude levels of each of said plurality of phases.

7. The apparatus of claim 1 further comprising:
   keyboard means for inputting alphanumeric data;
   computer means for processing said alphanumeric data; and
   an alphanumeric display area of said display screen for displaying alphanumeric data in response to commands from said computer means.

8. The apparatus of claim 1 wherein said camera has a fixed depth of field within the range of from one to four feet.

9. The apparatus of claim 1 wherein the position of said camera is adjustable.

10. The apparatus of claim 1 wherein said camera is mounted in the same horizontal plane as said first display screen area within two inches of said first display screen area.

11. The apparatus of claim 1 further comprising a lens cover for blocking said camera means.

12. The apparatus of claim 1 wherein said means for mapping the video source image comprises:
   digitizing means for representing the video source image as a series of digital values;
   means for storing said digital values in said memory;
   digital to analog converter means for converting said digital values to analog values; and
   means for sending said analog values to said video source image display means.

13. The apparatus of claim 1 wherein said first and second display screen areas comprise first and second areas of a single display monitor.

14. A conversational freeze-frame video phone for transmitting a voice signal and a single frame of a video gray scale source image over an ordinary telephone line, and receiving a remote voice signal and a remote video image from said telephone line, comprising:
   camera means for capturing said video source image;
   digitizing means for representing said captured video source image as a group of digital values;
   display memory means for storing said group of digital values;
   digital to analog converter means for converting digital values to analog values corresponding to from 2000 to 5,000 pixels representing one of said video source image and said remote video image;
   a modulator/demodulator operative to modulate a carrier signal with said digital values and demodulate such a modulated carrier signal such that transmission of said single frame of said video source image occurs in less than three seconds;
   a transmitter and receiver circuit coupled to said telephone line;
   a matrix of switches coupling said modulator/demodulator to said transmitter and receiver circuit;
   a microphone;
   a speaker;
   analog circuit means coupling said microphone and speaker to said matrix of switches for amplifying said voice signal;
   input keyboard means for inputting alphanumeric data;
   microprocessor means coupled to said input keyboard means for controlling the operation of said video phone; and
   display means for displaying images and data having a video source image display of approximately one square inch for displaying said pixels representing a real time mirror image of said video source image, a remote video image display of approximately one square inch for displaying from 2000 to 5,000 pixels representing said remote video image and an alphanumeric display area for displaying alphanumeric data from said microprocessor.

15. The video phone of claim 14 further comprising a telephone handset having switch means for selecting said frame of said video source image and for initiating a transmission of said frame of said video source image.

16. A method for transmitting a single frame of video gray scale source and remote images and audio signals over an ordinary telephone line using a video phone, comprising the steps of:
   capturing said video source image;
   storing a frame of said video source image in a memory;
   mapping the video source image onto a video source image field of from 2000 to 5,000 pixels;
   displaying said video source image field on a first display screen area having an area of approximately one square inch as a real time mirror image of said video source image;
   asynchronously transmitting over said telephone line a modulated signal representing said video source image field in a burst having an approximate duration of three seconds or less;
   asynchronously receiving from said telephone line a modulated signal representing a remote video image field;
   demodulating said receiving signal;
   displaying said remote video image field line-by-line as each line is received on a second display screen area immediately adjacent said first display screen area and having an area of approximately one square inch;
   transmitting a source audio signal over said telephone line; and
   receiving a remote audio signal from said telephone line.

17. The method of claim 16 wherein said asynchronous image transmitting step includes sending data at a data rate which is sufficiently high to transmit said video source image field without the use of data compression.

18. The method of claim 16 further comprising the step of activating a switch by a user to initiate the transmission of said video source image field.

19. The method of claim 16 further comprising the step of transmitting protocol data prior to transmission of said burst, said protocol data comprising:
   hardware preamble data for use by a remote video phone to synchronize a clock at said remote video phone with said protocol data;
   software preamble data for identifying the following data as representing a video image;
   automatic gain control adjustment data; and
   amplitude calibration data for correlating each received amplitude modulation level to a corresponding assigned amplitude modulation level.

20. The method of claim 19 further comprising the step of disabling said audio transmitting and receiving means in response to said software preamble data.

21. The method of claim 19 wherein said modulated signal comprises a plurality of phases and amplitude levels and wherein said amplitude calibration data comprises each of said amplitude levels at a first phase and at least one of said amplitude levels of each of said plurality of phases.

22. The method of claim 16 further comprising the steps of;
   inputting commands to said video phone via a keypad;
   processing said commands to produce alphanumeric data; and
   displaying said alphanumeric data on said video phone.

23. The method of claim 16 wherein said step of displaying said video source image field includes the steps of:
   representing the video source image field as a series of digital values;
   storing said digital values in said memory;
   converting said digital values to analog values; and
   providing said analog values to said first display screen area.

* * * * *